United States Patent [19]
Latif et al.

[11] Patent Number: 5,613,076
[45] Date of Patent: Mar. 18, 1997

[54] SYSTEM AND METHOD FOR PROVIDING UNIFORM ACCESS TO A SCSI BUS BY ALTERING THE ARBITRATION PHASE ASSOCIATED WITH THE SCSI BUS

[75] Inventors: Farrukh Latif, Malvern; Hung Nguyen, Downington, both of Pa.

[73] Assignee: Unisys Corporation, Blue Bell, Pa.

[21] Appl. No.: 352,051

[22] Filed: Nov. 30, 1994

[51] Int. Cl.$^6$ .................................................. G06F 13/36
[52] U.S. Cl. ........................... 395/293; 395/856; 395/859
[58] Field of Search ................................ 395/856, 859, 395/860, 865, 868, 731, 732, 734–737, 298–301, 893, 200.12, 200.13, 293, 294, 296

[56] References Cited

U.S. PATENT DOCUMENTS

| | | | |
|---|---|---|---|
| 4,821,170 | 4/1989 | Bernick et al. | 364/200 |
| 4,864,291 | 9/1989 | Korpi | 340/825.5 |
| 5,008,808 | 4/1991 | Fries et al. | 395/860 |
| 5,034,881 | 7/1991 | Hoashi et al. | 395/303 |
| 5,081,578 | 1/1992 | Davis | 395/325 |
| 5,204,951 | 4/1993 | Keener et al. | 395/294 |
| 5,247,622 | 9/1993 | Choi | 395/325 |
| 5,274,783 | 12/1993 | House et al. | 395/325 |
| 5,283,872 | 2/1994 | Ohnishi | 395/325 |
| 5,287,463 | 2/1994 | Frame et al. | 395/325 |
| 5,289,580 | 2/1994 | Latif et al. | 395/275 |
| 5,301,332 | 4/1994 | Dukes | 395/732 |
| 5,313,588 | 5/1994 | Nagashige et al. | 395/275 |
| 5,333,277 | 7/1994 | Searls | 395/325 |
| 5,377,331 | 12/1994 | Drerup et al. | 295/293 |
| 5,471,618 | 11/1995 | Isfeld | 395/859 |
| 5,475,850 | 12/1995 | Kahn | 395/293 |

*Primary Examiner*—Jack B. Harvey
*Assistant Examiner*—Ario Etienne
*Attorney, Agent, or Firm*—Sterne, Kessler, Goldstein & Fox P.L.L.C.

[57] ABSTRACT

A host device SCSI bus controller in SCSI bus system for uniformly distributing I/O tasks, thereby providing all devices equal access to a SCSI bus without decreasing the overall utilization of the bus. The controller prevents system errors from occurring due to I/O tasks not being transmitted when the connectivity of the bus is fully utilized and the bus is operating near saturation. The controller alters the host device performance during the arbitration phase by replacing the single occurrence of the SCSI standard specified arbitration phase with multiple arbitration phases. In the multiple arbitration phases the controller does not assert the host device ID until a user determined time after the completion of the SCSI standard specified arbitration phase. When the host device has an I/O command to transmit, SCSI bus controller executes a first arbitration phase, wherein it does not assert the host device ID unless there are no reselecting target devices and not until a user defined time after the SCSI standard specified arbitration delay has completed. This gives a reselecting target device the opportunity to gain control over the SCSI bus. Then, if there are additional reselecting target devices on the SCSI bus, the SCSI bus controller performs additional arbitration phases until the bus is free. At that time, the SCSI bus controller issues the pending I/O command. By delaying the assertion of the host device ID during repeated arbitration phases, the SCSI bus controller enables the remaining target devices the opportunity to sequentially gain control over the SCSI bus. The SCSI bus controller therefore allows all target devices to reselect the host device to complete previously issued I/O tasks prior to the host device issuing additional I/O commands. The SCSI bus controller allows for an exception when a host I/O command is delayed to such an extent that further delay will cause a system error. Under such conditions, the SCSI bus controller asserts the host ID during the next standard arbitration phase. The host will then win arbitration and transmit the critical I/O command.

11 Claims, 12 Drawing Sheets

FIG._4

SYSTEM AND METHOD FOR PROVIDING UNIFORM ACCESS TO A SCSI BUS BY ALTERING THE ARBITRATION PHASE ASSOCIATED WITH THE SCSI BUS

Background of the Invention

1. Field of the Invention

The present invention relates generally to the field of computing systems and more specifically, to the industry standard Small Computer System Interface (SCSI).

2. Related Art

The small computer systems interface (SCSI) is an American National Standard Institute (ANSI) standard communications bus that includes an electrical and logical protocol specification. The SCSI standard provides for the connection of up to a specific number of devices on a bus, each having a unique identification (ID). The devices can be of any type, ranging from host computers to disk drives, tape drives, optical storage devices, printers, scanners, etc.

SCSI has become an industry standard. It is used, for example, in the computer workstation as well as the personal computer environment. It has also become the standard for peripherals, such as disk drives, tape drives, optical storage devices, printers, scanners, etc. Like all standards, SCSI is used in a large number of installed pieces of computer equipment. Users have invested considerable money in computers and peripherals which employ the SCSI standard.

There are different types of SCSI bus interfaces. There are 8 data bit SCSI bus interfaces, such as the SCSI-1 interface and the SCSI-2 Narrow and Fast interface. Both of these SCSI interfaces consists of 8 data bits, a parity bit, and corresponding control signals. However, the SCSI-2 Narrow and Fast interface transfers data at twice the speed of SCSI-1. Another type of SCSI interface is a 16 data bit SCSI interface, referred to as the SCSI-2 Wide interface. The SCSI-2 Wide interface consists of 16 data bits, two parity bits, and corresponding control signals. In addition, a SCSI Wide interface also provides a Fast option, referred to as a SCSI-2 Wide and Fast interface, capable of transferring data at four times the speed of SCSI-1.

Each device on the SCSI bus is assigned a bus address or identification (ID). The value of the address corresponds to one data bit line on the SCSI bus. Thus, on a SCSI-1 or SCSI-2 Narrow bus, a maximum of 8 devices can be connected. On a SCSI-2 Wide bus, a maximum of 16 devices can be connected in a similar fashion.

FIG. 1 shows a block diagram of a conventional SCSI-1 bus system. Referring now to FIG. 1, SCSI-1 bus system 100 includes a host computer device 102 electrically connected to a SCSI bus 104. Host computer 102 has been assigned SCSI ID No. 7. Connected to SCSI bus 104 are seven additional devices 106, 108, 110, 112, 114, 116, and 118. These additional devices 106–118, referred to as peripheral devices, can be any device that complies with the protocol of the implemented SCSI standard. Additional peripheral device 106 has been assigned, for example, SCSI ID No. 0. Similarly, drive 108 has been assigned SCSI ID No. 1, drive 110 has been assigned SCSI ID No. 2, robotics 112 has been assigned SCSI ID No. 3, drive 114 has been assigned SCSI ID No. 4, drive 116 has been assigned SCSI ID No. 5, and robotics 118 has been assigned SCSI ID No. 6.

As an aside, it should be noted that drive 108, drive 110, and robotics 112 are shown as residing in an optical library enclosure 120. This is merely for purposes of illustration to show that more than one device connected to a SCSI bus can reside in a single physical enclosure. This inclusion of more than one SCSI device in a single physical (mechanical) enclosure is a trend, for example, in connection with the storage of large amounts of data.

The communication between SCSI host device 102 and a SCSI peripheral device 106–118 is conducted according to a predetermined format of signal transmissions dictated by the implemented SCSI protocol. The communication may consist of SCSI host 102 assuming the role of an initiator and sending a command to target peripheral device or devices 106–118. The target SCSI peripheral devices will perform a function according to the command sent by the host. The target SCSI device then returns results or status to host computer device 102.

The communication conducted between host device 102 and a target peripheral device 106–108 is controlled by the SCSI peripheral device through the issuance of control signals. Each binary value of the collection of these control signals is called a phase. FIG. 2 illustrates the SCSI bus phases of conventional SCSI bus system 100 which operate according to one of the above SCSI standards and which are relevant to the present invention. As is well known to one skilled in the relevant art, the SCSI logical architecture includes eight distinct phases. They are bus free phase 202, arbitration phase 204, selection and reselection phases 206, and information transfer phases 208. The information transfer phases 208 include a command phase, a data phase, a status phase, and a message phase.

Certain of the eight phases are shown together, such as selection and reselection phases 206. This is because either the selection phase or reselection phase, but not both simultaneously, will occur after bus free phase 202. Which phase occurs depends upon whether the host device 102 or a peripheral device 106–118 is to transmit over the bus. The type of communication (phase) is controlled by the SCSI peripheral devices. A SCSI peripheral device indicates its intention to host 102 through a combination of control signals. Thus, SCSI host device 102 cannot force a SCSI peripheral device 106–118 to transition to a given phase.

Communication on the SCSI bus is accomplished by any device (host or peripheral) initiating an arbitration phase 204. Arbitration phase 204 allows one SCSI device to gain control of SCSI bus 104 so that it can initiate or resume an input/output (hereinafter, "I/O") process. The established procedure for a SCSI device to obtain control of SCSI bus 104 consists of all devices first recognizing that the SCSI bus is available. That is, all devices recognize that SCSI bus 104 is in bus free phase 202. Then, after waiting a minimum bus settle delay of 400 nanoseconds (ns) after the occurrence of bus free phase 202, the SCSI devices assert their SCSI ID. Each SCSI bus ID is associated with a unique data bit assigned to the SCSI device. When a SCSI device asserts its ID, it drives the data bit line corresponding to its assigned address. After an additional period of time of 2400 ns, all devices examine the asserted data bits. The device with the highest SCSI ID value wins the arbitration. That device then initiates the selection (host to peripheral) or reselection (peripheral to host) phase 206. After a successful selection or reselection phase 206, the actual information is exchanged between the devices in information transfer phases 208.

The process performed in arbitration phase 204 favors the SCSI device having the highest SCSI bus address (ID) on SCSI bus 104. Configuration guidelines for SCSI bus systems operating in accordance with the above SCSI standards recommend that host computer 102 be assigned the highest address ID (ID=7 on an 8 bit wide SCSI bus (FIG. 1) or ID=15 on a 16 bit wide SCSI bus). When host device 102 is to send a command to an idle peripheral device, it will initiate arbitration phase 204. By virtue of its SCSI bus address, host device 102 is given the highest priority on SCSI bus 104. Thus, resolution during arbitration phase 204 will result in host device 102 winning arbitration over peripheral devices at lower addresses (IDs) that may need to connect to host computer 102. Host computer 102 will then enter selection phase 206 followed by information transfer phases 208.

In addition to host device 102 winning arbitration over peripheral devices, a similar phenomenon occurs among peripheral devices 106–118. In systems having multiple peripheral devices attached to SCSI bus 104, a peripheral device having a higher address will always win arbitration over the peripheral device having a lower address. For example, drive 116, having an address of 5, will always win arbitration over drive 108 having an address of 1.

In a high performance computer system such as that illustrated in FIG. 1, host device 102 typically has several I/O tasks ready to be issued to some or all of the peripheral devices connected to SCSI bus 104. The I/O tasks are generally waiting in a queue. When SCSI bus 104 enters bus free phase 202, host device 102 will initiate arbitration phase 204 and win arbitration. It will then select (phase 206) and issue (phase 208) an I/O to one of the peripheral devices. After a disconnection at the end of information transfer phases 208, SCSI bus 104 again enters bus free phase 202. When bus free phase 202 occurs, all SCSI devices will arbitrate again in arbitration phase 204 and host device 102 will win arbitration again to issue another I/O task. This sequence of events will be continually repeated until host device 102 has issued all queued I/O tasks.

When a peripheral device is ready to exchange data, it will have to wait until it wins arbitration during arbitration phase 204. Since all the peripheral devices have I/O tasks, they are working concurrently until they are ready to exchange data with host 102. When SCSI bus 104 goes free in bus free phase 202, the peripheral device with the highest address (robotics 108 with SCSI ID=6) will win the arbitration, provided host 102 (at a higher address of 7) does not have an I/O command to send. After the I/O task is completely finished, the next lower priority peripheral device (drive 116 with SCSI ID=5) will win arbitration and will then exchange data with host 102. The process will continue until such time when host computer system 102 has a new I/O task for one of the peripheral devices. At this time, host device 102 will win arbitration over a peripheral device with a lower address that is attempting to complete a previously issued I/O task.

With advances in technology, host computer systems and peripheral devices can issue and complete I/O tasks at a very rapid rate. The data exchange consumes a finite amount of time on SCSI bus 104 and depends on the length of the data transfer. If, for example, the I/O task is completed by robotics peripheral device 118 at SCSI address 6, host computer system 102 can then issue another I/O task to this device. If such was the case, the new I/O task will be issued and the device at address 6 will quickly become ready to exchange data again. If the SCSI peripheral devices having lower addresses have not completed their I/Os from a previous request, they will be preempted by the new I/O task from the device at address 6. If the cycles were allowed to continue, devices at lower addresses will be unable to finish their I/O tasks, even though the bus is operating at full capacity.

The standard SCSI arbitration mechanism also causes an uneven distribution of I/Os serviced by the peripheral devices connected on a SCSI bus. For example, devices 116 (ID=5), 114 (ID=4), 110 (ID=2), and 108 (ID=1) are like-type devices connected to SCSI bus 104. The devices at higher addresses, such as drives 116 and 118, will service a far greater number of I/O tasks than the devices at lower addresses, such as devices 110 and 108. This phenomenon falsely conveys that the devices at lower addresses are malfunctioning or have much slower access time than similar devices at the higher addresses.

In addition, if I/O tasks are not serviced within an associated period of time they time-out, causing a system error. This may occur in SCSI devices having lower SCSI IDs operating in a SCSI bus system wherein the SCSI bus is heavily utilized, resulting in little or no idle time on the SCSI bus. Under such conditions, the devices having a lower address are not granted the opportunity to use the SCSI bus due to repeatedly losing arbitration. The potential for this occurring increases as SCSI bus utilization increases.

What is needed, therefore, is the ability to allow a uniform distribution of I/O tasks with all devices getting equal access on the SCSI bus and without decreasing the utilization of the bus. Furthermore, it is desired that such a mechanism prevents the I/O tasks from timing out to any of the devices (most likely those with a lower address) when the connectivity of the bus is fully utilized and the bus is operating near saturation.

Summary of the Invention

The present invention is a system and method for uniformly distributes I/O tasks, thereby providing all devices equal access to a SCSI bus without decreasing the overall utilization of the bus. Furthermore, the present invention prevents system errors from occurring due to I/O tasks not being transmitted when the connectivity of the bus is fully utilized and the bus is operating near saturation.

The present invention overcomes the system related problems of uneven I/O distribution and I/O time-out by altering the logical characteristics of the standard SCSI bus protocol executed by the host computer device. More specifically, the present invention is a SCSI bus controller configured to alter a host processor's performance during arbitration phase to replace the single occurrence of the SCSI standard specified arbitration phase with multiple arbitration phases. In the multiple arbitration phases the controller does not assert the host device ID until a user determined time after the completing of the SCSI standard specified arbitration phase.

When the host device has an I/O command to transmit, SCSI bus controller first executes a first arbitration phase, wherein it does not assert the host device ID unless there are no reselecting target devices and not until a user defined time after the SCSI standard specified arbitration delay has completed. This gives a reselecting target device the opportunity to gain control over the SCSI bus. Then, if there are additional reselecting target devices on the SCSI bus, the SCSI bus controller performs additional arbitration phases until the bus is free. At that time, the SCSI bus controller issues the pending I/O command.

By delaying the assertion of the host device ID during repeated arbitration phases, the SCSI bus controller enables the remaining target devices the opportunity to sequentially gain control over the SCSI bus. The SCSI bus controller therefore allows all target devices to reselect the host device to complete previously issued I/O tasks prior to the host device issuing additional I/O commands.

The SCSI bus controller allows for an exception when a host I/O command is delayed to such an extent that further delay will cause a system error. Under such conditions, the SCSI bus controller asserts the host ID during the next standard arbitration phase. The host will then win arbitration and transmit the critical I/O command.

Brief Description of the Figures

The present invention as defined by the claims is better understood with reference to the written description read in conjunction with the following drawings, wherein.

Detailed Description of the Preferred Embodiments

Introduction

The present invention is a system and method that overcomes the significant system related problems when a SCSI interface is deployed in a computer system such as uneven distribution of I/O tasks serviced by the peripheral devices and time-out of I/O tasks which are never serviced in high bus utilization environments. The present invention uniformly distributes I/O tasks, providing all devices equal access to a SCSI bus without decreasing the overall Utilization of the bus. Furthermore, the present invention prevents I/O tasks from timing out to any of the devices when the connectivity of the bus is fully utilized and the bus is operating near saturation.

The present invention achieves these advances by altering the logical characteristics of the standard SCSI bus protocol executed by the host computer device. More specifically, the present invention is a SCSI bus controller configured to alter a host processor's performance during arbitration phase 204 by replacing the arbitration phase 204 with two arbitration phases. In the present invention, arbitration phase 204 is replaced with a first arbitration phase, referred to as a slow arbitration phase and second arbitration phase, referred to as a standard arbitration phase.

The SCSI bus controller of the present invention performs all SCSI bus interface functions. During slow arbitration phase, the SCSI bus controller of the present invention does not assert the host device ID, giving a reselecting target device the opportunity to gain control over the SCSI bus. If there are no additional reselection target devices, the SCSI bus controller will perform standard arbitration phases until it is able to issue the pending I/O command.

During the standard arbitration phase, the SCSI bus controller delays assertion of the host device ID, giving the remaining target devices the opportunity to sequentially gain control over the SCSI bus. The SCSI bus controller therefore allows all target devices to reselect the host device to complete previously issued I/O tasks prior to the host device issuing additional I/O commands.

The SCSI bus controller allows for an exception when a host I/O command is delayed to such an extent that further delay will cause a system error. Under such conditions, the SCSI bus controller asserts the host ID during the next standard arbitration phase. The host will then win arbitration and transmit the critical I/O command.

Further details of the functions performed by the SCSI bus controller are discussed below. First, the architecture of a SCSI bus system in which the SCSI bus controller of the present invention is implemented is described. The phases of the SCSI bus system resulting from the implementation of the SCSI bus controller of the present invention are then described. Finally, the functions performed by the SCSI bus controller are described.

System Architecture

Figure 1:
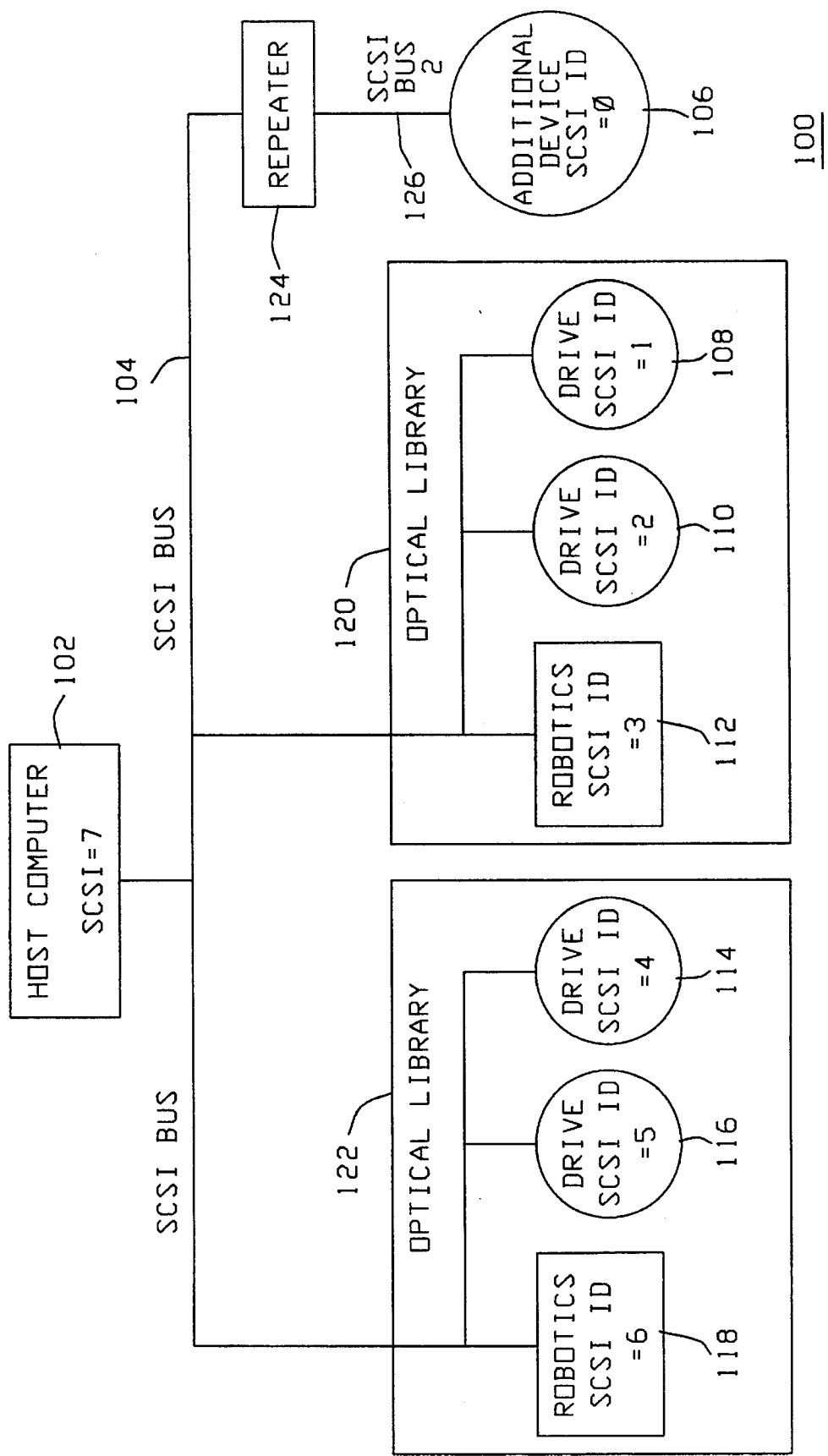
FIG. 1 is a block diagram of a conventional system having multiple devices connected to a host computer on a SCSI bus.
Figure 2:
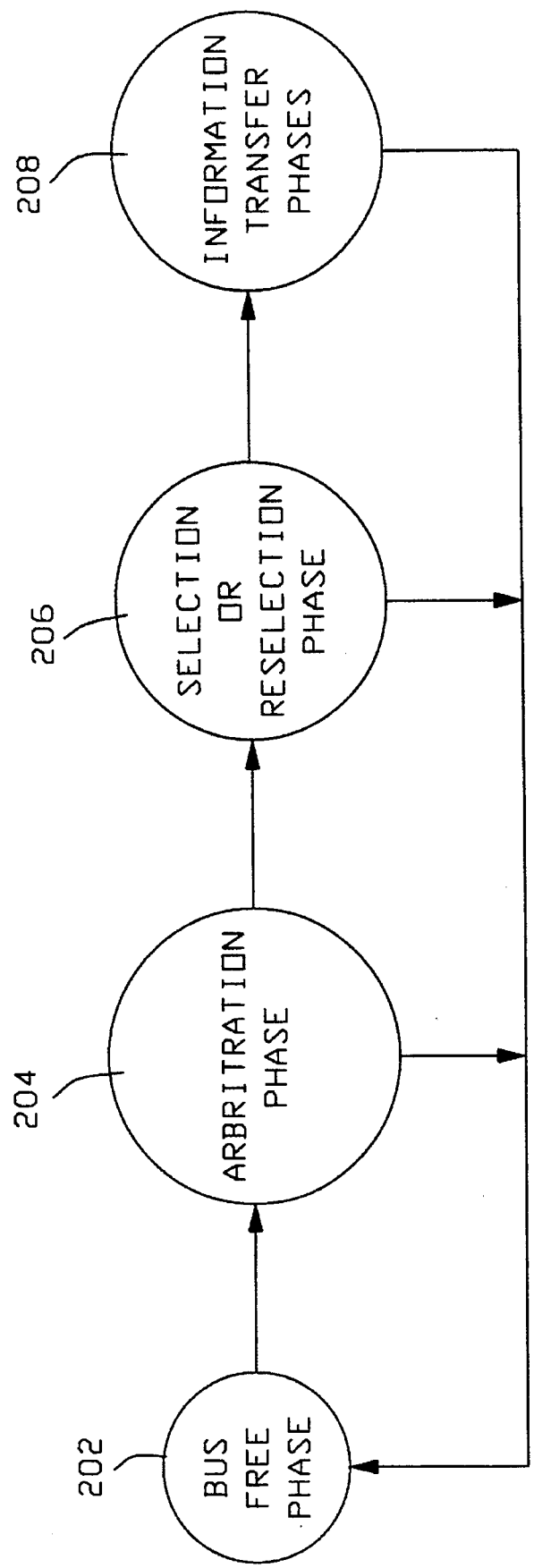
FIG. 2 is a phase transition diagram of the SCSI bus phase sequences.
Figure 3:
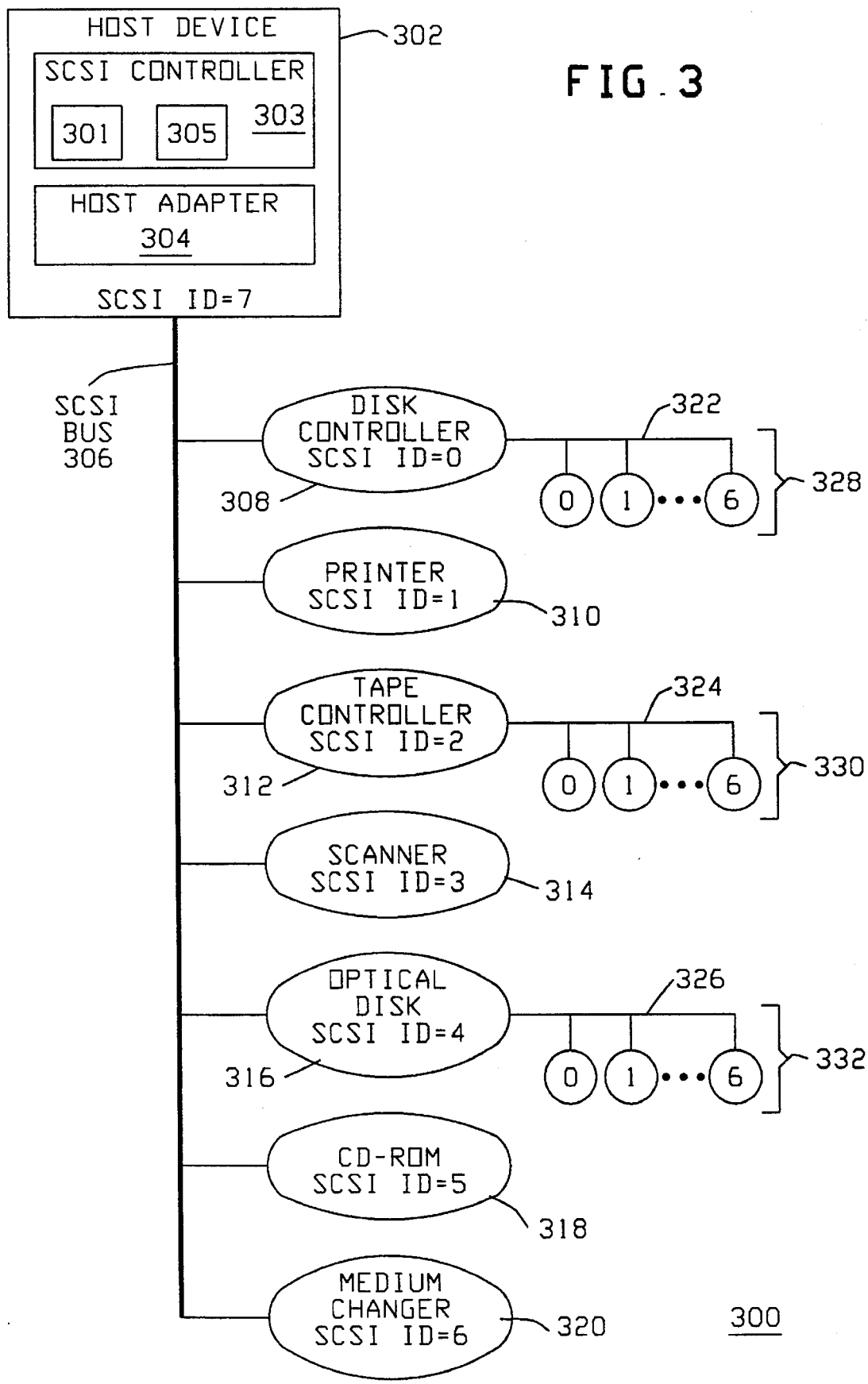
FIG. 3 is a block diagram of a SCSI bus system wherein the host computer device of the present invention is implemented.
Figure 4:
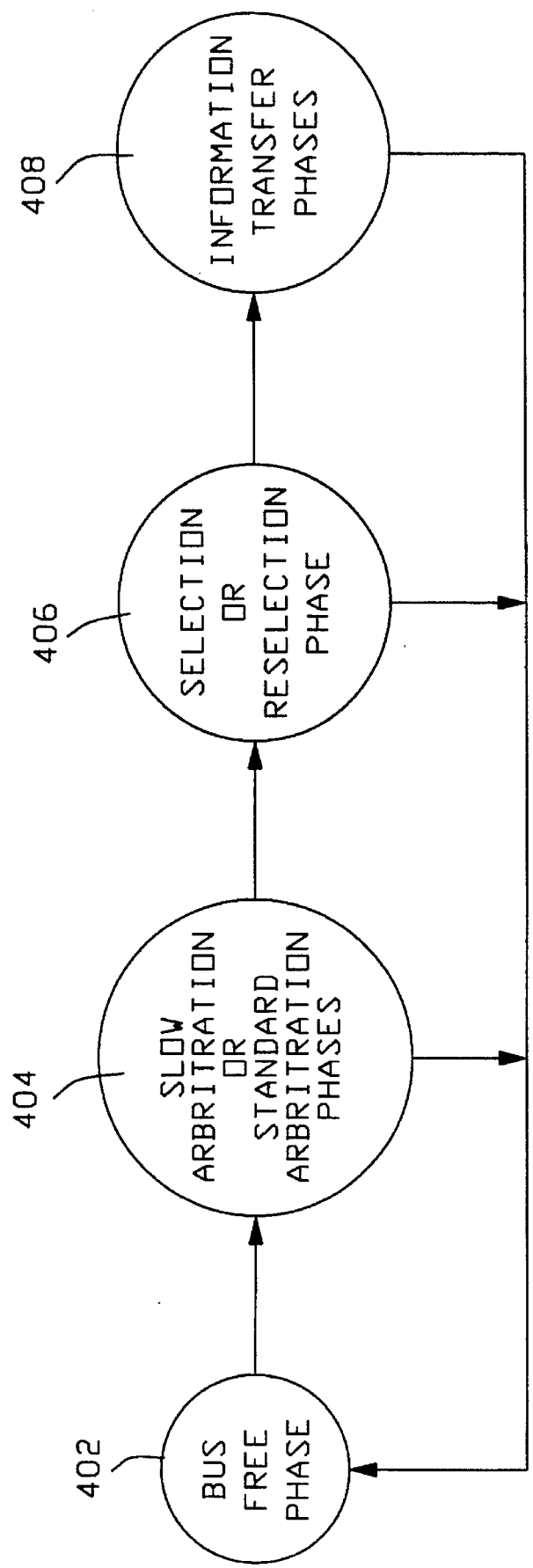
FIG. 4 is a phase transition diagram of the SCSI bus phase sequences of the present invention.

FIG. 3 is an interface block diagram of a SCSI bus system 300 wherein the preferred embodiment of the SCSI bus controller of the present invention is implemented. FIG. 4 illustrates the phase transitions for the SCSI bus system 300 wherein the SCSI bus controller 303 of the present invention is implemented. Referring now to FIGS. 3 and 4, the architecture and general operation of a SCSI bus system 300, wherein the SCSI bus controller of the present invention is implementing, are now described.

Referring to FIG. 3, a host computer 302 is electrically connected to SCSI bus 306. Host computer 302 is also referred to as SCSI host device 302 and is assigned an SCSI ID of 7. Also coupled to SCSI bus 306 are a plurality of peripheral devices. Specifically, disk controller 308, printer 310, tape controller 312, scanner 314, optical disk 316, CD-ROM 318, and medium changer 320 are coupled to SCSI bus 306. These additional devices 308–320 can be of any configuration that complies with the SCSI standard protocol implemented on SCSI bus 306.

Each device has been assigned an address (identification or ID) in accordance with the implemented SCSI protocol. Disk controller 308 has been assigned, for example, SCSI ID No. 0. Similarly, printer 310 has been assigned SCSI ID No. 1; tape controller 312, SCSI ID No. 2; scanner 314, SCSI ID No. 3; optical disk 316, SCSI ID No. 4; CD-ROM 318, SCSI ID No. 5; and medium changer 320, SCSI ID No. 6.

In the preferred embodiment, SCSI bus 306 may be any type of SCSI bus now or later developed. For example, SCSI bus 306 may be an 8 data bit SCSI interface such as the SCSI-1 or SCSI-2 Narrow and Fast interface, both of which consist of 8 data bits, a parity bit, and corresponding control signals. Alternatively, SCSI bus 306 may be a 16 data bit SCSI interface such as a SCSI-2 Wide or SCSI-2 Wide and Fast interface, each of which consists of 16 data bits, two parity bits, and corresponding control signals. For purposes of illustration only, SCSI bus 306 is a SCSI-1 bus and has the maximum of 8 peripheral devices connected.

The electrical and logical protocol specifications for SCSI-1 and SCSI-2 are described in American National Standards Institute (ANSI) document numbers X3.131-1986 and X3.131-199X, available from Global Engineering Documents, Irvine, Calif., U.S.A., incorporated by reference herein in their entireties.

There are an additional seven devices, generally referred to as devices 328, that are associated with disk controller 308 and its associated SCSI bus ID. These seven devices are connected to disk controller 308 by a subordinate SCSI bus 322. The protocol used on subordinate SCSI bus 322 is a standard SCSI protocol. Thus, it can be appreciated, that the additional devices 328 connected to the subordinate SCSI bus 322 can be ones that operate in accordance with conventional SCSI protocol. Likewise, there are an additional seven devices 330 and 332 respectively connected to tape controller 3 12 and optical disk 316 by subordinate SCSI bus 324 and 326.

SCSI bus system 300 operates in accordance with the standard SCSI interface chosen. The type of communication is controlled by the SCSI peripheral device by way of indicating to host device 302 its intention through a combination of control signals, the binary value of which is called a phase. The phase transitions occurring in a SCSI bus system 300, wherein the SCSI bus controller 303 of the present invention is implemented are described in FIG. 4 and discussed below.

SCSI Bus Phases

The present invention achieves a uniform distribution of I/O tasks by altering the logical characteristics of the standard SCSI bus. More specifically, the present invention replaces the SCSI standard arbitration phase with a slow arbitration phase and a standard arbitration phase. Referring to FIG. 4, the SCSI bus phases of SCSI bus system 300 wherein the SCSI bus controller 303 of the present invention is implemented includes a bus free phase 402, a slow arbitration/standard arbitration phase 404, a selection/reselection phase 406, and information transfer phases 408.

The operational characteristics of SCSI bus system 300 is the same as that of conventional SCSI bus systems with regard to bus free phase 402, selection/reselection phase 406, and information transfer phases 408. That is, bus free phase 402 is equivalent to bus free phase 202. Likewise, selection/reselection phase 406 is equivalent to selection/reselection phase 206, and information transfer phases 408 are equivalent to information transfer phases 208.

However, as described above, the SCSI bus system 300 wherein the SCSI bus controller 303 of the present invention is implemented has two types of arbitration phases, each executed under certain conditions. Arbitration phase 404 includes a slow arbitration phase and a standard arbitration phase. The SCSI bus operation during these arbitration phases is controlled by SCSI bus controller 303 controlling when host device 302 asserts its ID and issues I/0 commands. By preventing and delaying the assertion of the host device ID, SCSI bus controller 303 enables reselecting target devices to gain control over the SCSI bus to complete previously issued I/O tasks prior to the host device issuing additional I/O commands.

SCSI Bus Controller

Figure 5:
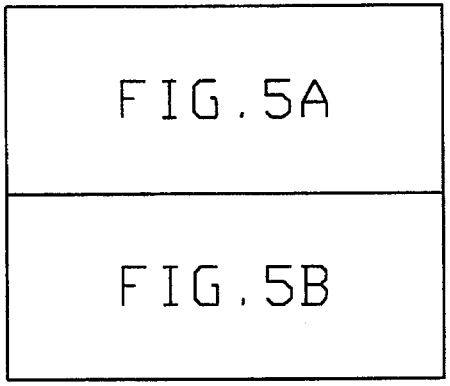
FIG. 5 is a diagram illustrating the orientation of the flow charts illustrated in FIGS. 5A and 5B.
Figure 5A:
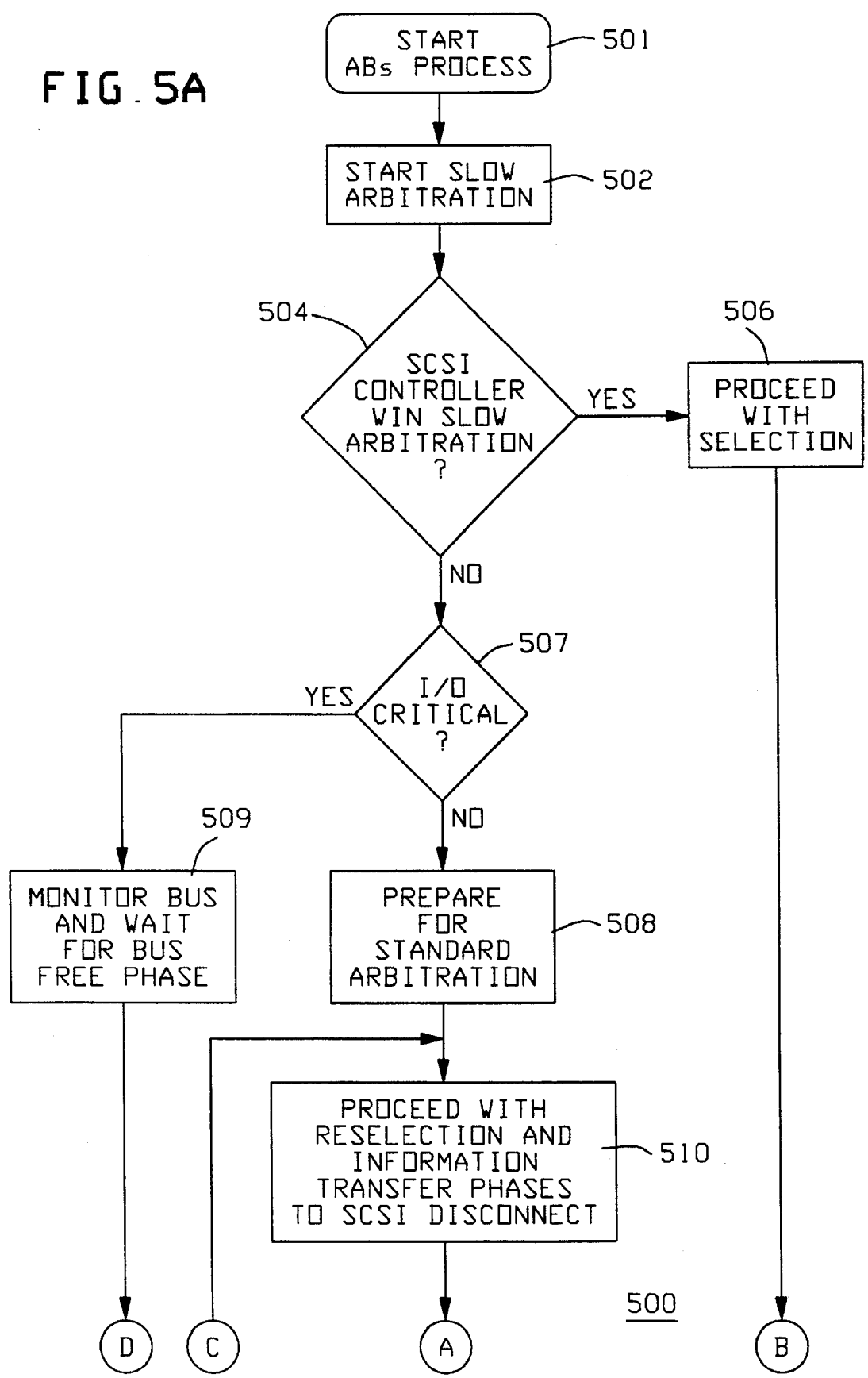
FIGS. 5A and 5B are flow charts of the uniform I/O and anti-bus saturation (ABS) process of the present invention.
Figure 5B:
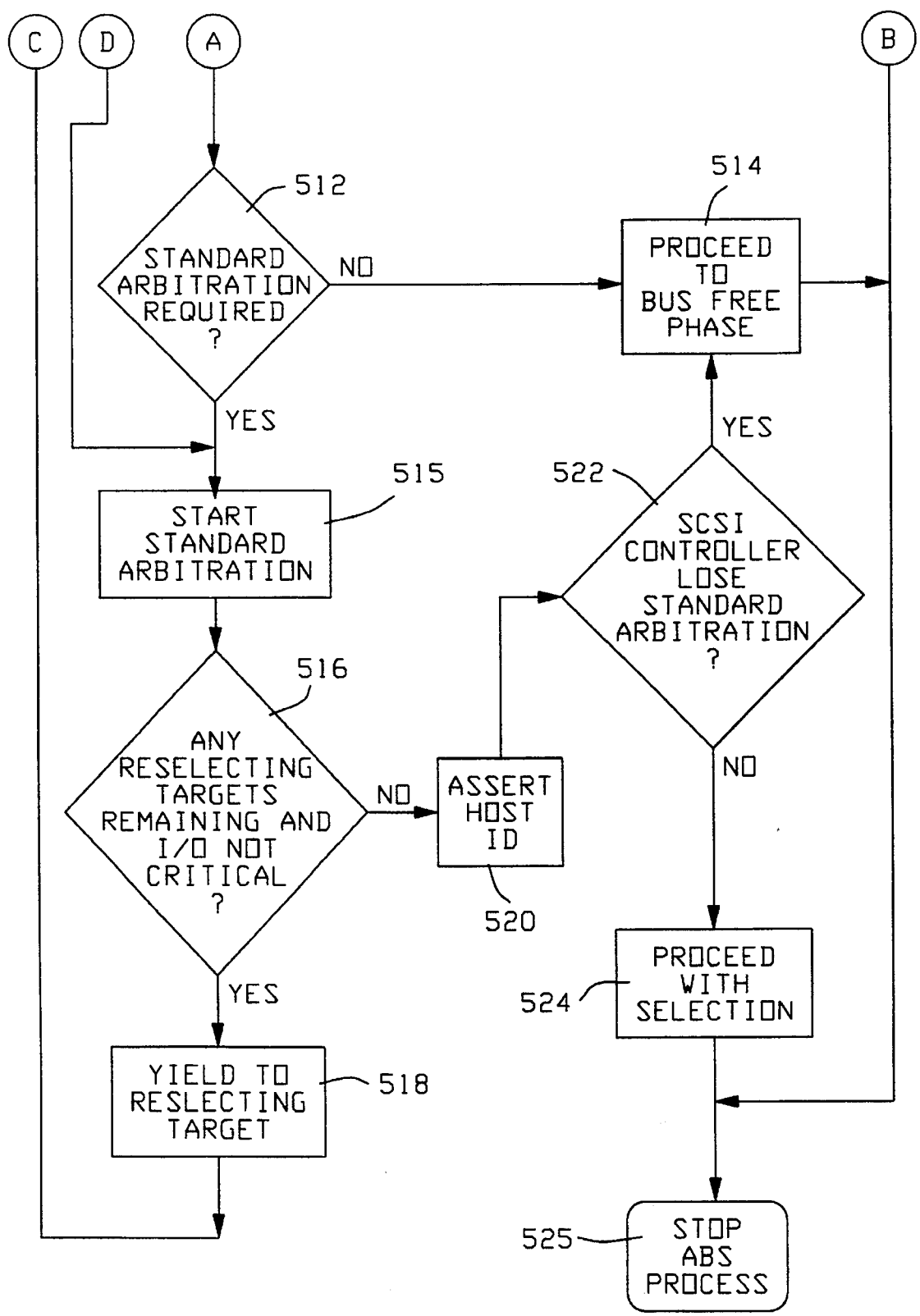

The function and operation of the preferred embodiment of the SCSI bus controller 303 of the present invention is now described with reference to FIGS. 5, 5A, and 5B. FIG. 5 is a block diagram illustrating the orientation of the flow charts illustrated in FIGS. 5A and 5B. Together, FIGS. 5A and 5B illustrate an overview of the uniform I/O and anti-bus saturation (ABS) process 500 ("ABS process 500") performed by the preferred embodiment of the SCSI bus controller 303 of the present invention.

In the preferred embodiment of the present invention, host adapter 304 is a SCSI-1 and SCSI-2 Channel Host Adapter, available from Unisys Corporation, Plymouth Meeting, Pa., U.S.A. Host adapter 304 is described in commonly owned U.S. Pat. No. 5,289,580 to Latif et al., herein incorporated by reference in its entirety. Unlike conventional SCSI bus controller ASICs, the preferred Unisys ASIC 304 provides the capability to program SCSI bus timing at the physical signal interface level. This capability is used by the SCSI bus controller 303 to provide uniform I/O distribution and prevent I/O time-outs resulting from bus saturation on SCSI bus 306. However, as one skilled in the relevant an would find apparent, the present invention may be implemented in many other configurations. For example, the present invention may operate on an ASIC which can be programmed to provide the necessary level of control.

As discussed above, SCSI controller 303 overcomes the problems of uneven I/O distribution and I/O time-out. To accomplish this, a first means 301 of SCSI controller 303 uniformly distributes the I/O tasks, thereby providing all devices equal access to SCSI bus 306 without decreasing the overall utilization of the bus. SCSI controller 303 also comprises a second means 305 for preventing I/O tasks from timing out to any of the devices when the connectivity of the bus is fully utilized and the bus is operating near saturation. The operation of SCSI controller 303 in general and first and second means in particular are described below with reference to FIGS. 5A and 5B.

ABS process 500 is invoked by SCSI bus controller 303 when host device 302 has an I/O command to send to a peripheral target device. SCSI bus 306 must be in bus free phase 402 for host device 302 to issue an I/O command. When there is no activity on SCSI bus 306, host device 302 is in what is commonly referred to as an idle state with respect to performing I/O functions. When host device 302 generates an I/O command to send to a target SCSI peripheral device, it notifies SCSI bus controller 303 that an I/O command is pending. Upon receiving that notification, SCSI bus controller 303 invokes ABS process 500. Through the processing of ABS process 500, SCSI bus controller 303 controls the occurrence of slow arbitration and standard arbitration phases 404.

Referring to FIG. 5A, ABS process 500 begins at start ABS process 501. For each I/O command which is issued by host device 302, SCSI bus controller 303 first attempts to transmit the I/O command by performing a slow arbitration phase 404. As introduced above, during slow arbitration phase 404, SCSI bus controller 303 does not assert the host device ID. This provides the reselecting target device with the highest priority the opportunity to gain control over SCSI bus 306. Thus, the first process performed in ABS process 500 is starting slow arbitration phase 404 at block 502.

In the present invention, slow arbitration phase 404 has a programmable duration. Slow arbitration 404 may therefore be defined to be of any duration longer than the SCSI standard specified duration of 2400 ns for arbitration phase 204. In the preferred embodiment of the present invention, slow arbitration phase 404 is approximately 20 microseconds (20000 ns). This is to enable host device 302, which is a multi-tasking device, managing over 100 I/O tasks simultaneously to perform an appropriate task switch and place the I/O to be issued on the stack for execution. This communications preparation procedure is application specific and not pertinent to the present invention other than to establish a time during which the I/O command is being prepared for transmission. Further description of this procedure may be found in the above-incorporated U.S. Pat. No. 5,289,580. As one skilled in the relevant art would find apparent, the duration of slow arbitration phase 404 may be any value appropriate for a particular application.

The longer arbitration delay in slow arbitration phase 404 ensures that any reselecting target device will be granted access to SCSI bus 306 and have the opportunity to reselect host device 302. In other words, SCSI peripheral devices, which include standard SCSI bus controller chips that enforce the arbitration delay specified in the SCSI standard, will win arbitration over SCSI bus controller 303 during slow arbitration phase 404.

Thus, in block 502, SCSI bus controller 303 deliberately allows a reselecting target device to win arbitration over host device 302 by not asserting the host device ID until well after the SCSI-standard specified 2400 ns arbitration delay. If there are no SCSI peripheral devices that require access to SCSI bus 306 (i.e., no reselecting target devices), then SCSI bus controller 303 will assert the host device ID at the end of the slow arbitration phase to send the pending I/O command to a target peripheral device.

At the completion of slow arbitration phase 404, processing continues at decision block 504. In decision block 504, SCSI bus controller 303 determines whether it has won slow arbitration. If SCSI bus controller 303 has won slow arbitration, then there are no reselecting peripheral devices on SCSI bus 306 to which host device 302 must yield. Therefore, host device 302 may then transmit the pending I/O command. Under these conditions, processing then proceeds to block 506 wherein the standard SCSI process occurs. That is, SCSI bus 306 enters selection phase 406, allowing host computer 302 to select a target device for the purpose of initiating some target function. After host computer 302 selects a target peripheral device, SCSI bus 306 enters information transfer phases 408. Host device 302 then issues the pending I/O command to the selected SCSI peripheral device. Once selection phase 406 has begun at processing block 506, ABS process 500 processing ceases while the standard SCSI protocol occurs. This is shown in FIG. 5A where process continues connector B/FIG. 5B, to stop arbitration process 525 in FIG. 5B.

If in decision block 504, SCSI bus controller 303 determines that it has lost slow arbitration, then processing will proceed at block 507. SCSI bus controller 303 may lose arbitration to a reselecting target device or to another host device having a higher ID. Although the SCSI bus system 300 illustrated in FIG. 3 and described above has a single host device 302, a SCSI bus system may contain multiple host devices. For example, in a SCSI bus system having two host devices, referred to as a dual initiator configuration, the two host devices contend with each other for access to the SCSI bus. In addition, a reselecting target device may wish to reselect another host device, in which case, host device 302 will not participate in any bus activity.

If SCSI bus controller 303 determines that it has lost slow arbitration in decision block 504, SCSI bus controller 303 proceeds to decision block 507 where it evaluates the criticality of the pending I/O command. A pending I/O is critical if delaying the transmission of the I/O command will cause a system error to occur. This enables the SCSI bus controller 303 of the present invention to prevent a critical function from not being addressed and thereby experiencing a time-out condition. In other words, it guarantees the transmission of the I/O command regardless of the activity on the bus.

If in decision block 507 SCSI bus controller 303 determines that the pending I/O is critical, then SCSI bus controller 303 will attempt to transmit the command as soon as possible. SCSI bus controller 303 then proceeds to block 509 wherein it will monitor SCSI bus 306 until it becomes free again. When SCSI bus 306 enters bus free phase 402, SCSI bus controller 303 will proceed to standard arbitration phase at block 515 through connector D/FIG 5B. This processing block will be described in detail below.

If in decision block 507 SCSI bus controller 303 determines that the pending I/O is not critical, then SCSI bus controller 303 will yield to the reselecting target device and proceed to block 508. In block 508, SCSI bus controller 303 prepares for a future standard arbitration phase 404. Since host device 302 has not transmitted the I/O command during slow arbitration, it must transmit it during a subsequent standard arbitration phase. Functions performed by SCSI bus controller 303 during the performance of block 508 include the setting of a flag to indicate that an attempt at a connection to SCSI bus 306 has been made and determining the duration of time that the I/O command has been pending for the above criticality evaluation.

After the preparation for standard arbitration phase 404 in block 508 processing continues at block 510 wherein SCSI bus controller 303 allows the reselecting target proceed with reselection and information transfer phases. That is, in block 510 SCSI bus controller 303 proceeds to reselection phase 406. The SCSI reselection phase 406 occurs under control of the reselecting target device that won slow arbitration. Following reselection phase 406, the reselecting target device will cause host computer device 302 to exchange data or status information in information transfer phases 408.

As shown in FIG. 5A, block 510 may also be performed after block 518 in FIG. 5B though connector C/FIG. 5B. Block 518 is the last function performed by SCSI bus controller 303 after performing a standard arbitration phase 404 wherein it is determined that an additional reselecting target device (rather than host device 302) is to transmit over SCSI bus 306.

As shown in block 510, at the end of information transfer phases 408, the reselecting target device sends host device 302 a SCSI bus disconnect message indicating its intention to enter bus free phase 402. This process of disconnecting from SCSI bus 306 is generally referred to as SCSI bus disconnect. Upon receiving the SCSI bus disconnect message, SCSI bus controller 303 then proceeds to decision block 512 in FIG. 5B through connector A/FIG. 5B, to determine if standard arbitration is required. This determination is performed prior to entering bus free phase 402. That is, before SCSI bus 306 enters bus free phases 402, SCSI bus controller 303 will determine if it is necessary to perform standard arbitration.

Standard arbitration is required when there is an I/O command pending in host device 302 due to SCSI bus controller 303 previously losing arbitration, either to a reselecting target device or to another host device on SCSI bus 306. SCSI controller 303 may have lost arbitration during slow arbitration (block 504; discussed above) or standard arbitration (block 518; discussed below).

If SCSI bus controller 303 determines that standard arbitration is not required in decision block 512, that is, it determines that there are no additional pending I/O commands to be transmitted, processing then continues at block 514 wherein SCSI bus controller 303 proceeds to bus free phase 402.

If in decision block 512 SCSI bus controller 303 determines that standard arbitration is required because there is an I/O pending in host device 302, then SCSI bus controller 303 starts standard arbitration at block 515 following a bus free phase 402. Thus, standard arbitration is needed when host device 302 has lost slow or standard arbitration for this I/O command and the I/O command is still pending.

As discussed above, during standard arbitration phase 404, SCSI bus controller 303 delays the assertion of the host device ID, giving target devices the opportunity to sequentially gain control over SCSI bus 306. To enable the reselecting target devices to win arbitration, SCSI bus controller 303 does not assert the host device ID during the entire standard arbitration delay of 2400 ns. In the preferred embodiment, SCSI bus controller 303 waits an additional 200 ns before asserting the host ID. Thus, standard arbitration phase 404 consists of the SCSI specified 2400 ns arbitration delay plus an additional arbitration delay of 200 ns, for a total standard arbitration delay of 2600 ns. During the 2400 ns delay, SCSI bus controller 303 processing proceeds to decision block 516.

At decision block 516 SCSI bus controller 303 snoops SCSI bus 306 for an arbitration attempt by any SCSI peripheral device. If no peripheral device asserts its ID during the SCSI specified 2400 ns, then there are no reselecting target devices. Also in decision block 516, SCSI bus controller 303 determines whether the pending I/O command is critical.

The bus loading and the I/O characteristics may create a situation where the host computer device will keep yielding (loosing arbitration) forever to SCSI peripheral devices in decision block 516, despite the standard arbitration mode indication. To prevent such a situation from occurring, a critical time function is provided. The function is invoked when the host SCSI device evaluates the standard arbitration mode prior to entering bus free phase 402 in decision block 516. If the critical time value of the waiting I/O indicates that it has been waiting for a threshold amount of time, then SCSI bus controller 303 participates in the arbitration process using the host device ID. Since it has a higher ID compared to the peripheral devices, it will win arbitration. This guarantees that new commands are issued in a reasonable amount of time regardless of the extent of bus utilization. If there are no reselecting target devices or if there are reselecting target devices but the pending I/O command is critical, then processing continues at block 520.

In block 520, SCSI bus controller 303 waits the additional arbitration delay of 200 ns before asserting the host device ID. In the preferred embodiment of the present invention, an additional 200 ns delay enables SCSI bus controller 303 to verify that there are no more reselecting target devices remaining on SCSI bus system 300. This is because in SCSI bus system 300, some peripheral devices are located at a distance which may require additional time for their associated IDs to settle on the bus during arbitration. However, as one skilled in the relevant art would find apparent, any or no additional time delay may be added to the standard 2400 ns arbitration delay. Thus, the slow arbitration delay and the standard arbitration delay can be configured to be of the same duration.

As discussed above, the present invention achieves optimum bus utilization while simultaneously ensuring that all critical functions are addressed, thereby avoiding a time-out condition from occurring. The SCSI bus controller 303 guarantees the transmission of all critical I/O commands by performing a condition check in decision block 516 by determining whether the elapsed I/O critical time is greater than a threshold value (discussed below with reference to FIGS. 6A and 6B).

If in decision block 516 SCSI bus controller 303 determines that another SCSI peripheral device requires service from host computer 302 and that the pending I/O command is not critical, then processing proceeds to block 518. In block 518, SCSI bus controller 303 yields to the reselecting target device by refraining from asserting the host device ID during the standard arbitration delay of 2400 ns (it will not be a contender). Thus, the reselecting target device with the highest ID will win standard arbitration and processing continues at block 510 through connector C/FIG. 5A.

During block 510, the reselecting target device will proceed with reselection phase 406 and other information transfer phases 408 and eventually disconnect from SCSI bus 304. Before SCSI bus 306 returns to bus free phase 402, host device 302 will again evaluate the necessity of performing a standard arbitration at decision block 512 and, if necessary, will proceed as described above. As discussed above, the duration of the slow and standard arbitration periods are user-defined values. It should also be understood that the duration of the remaining standard arbitration phases may also be user-defined and different than the 2600 ns delay described above. Thus, the reference to the first arbitration phase as the slow arbitration phase and the following arbitration phases as standard arbitration phases are merely for reference to their relative durations in the preferred embodiment.

Host device will continue the execution of blocks 512, 515, and 518 until the pending I/O becomes critical or until there are no more reselecting target devices and host device 302 is able to transmit its noncritical I/O command. Under either of these conditions, processing continues at block 520 with standard arbitration phase 404 wherein host device 302 asserts its ID at 2600 ns.

After SCSI bus controller 303 determines in decision block 516 that host device 302 will be a contender, SCSI bus controller 303 will win arbitration over any reselecting target devices (in the condition that the pending I/O is critical) because SCSI bus system 300 is configured with host device 302 having the highest ID. However, in decision block 522, host device 302 determines whether it has lost arbitration. This function is necessary when SCSI bus system 300 is configured with more than one host device as described above. For example, in a dual initiator configuration, the other host device may have a SCSI ID greater than that of host device 302.

If in decision block 522 SCSI bus controller 303 determines that it has lost arbitration, then processing continues at block 514, wherein SCSI bus controller 303 causes the SCSI bus to enter bus free phase 402. In block 514, SCSI bus controller 303 also causes host device to enter idle state. The ABS process then ends at end block 525, until another I/O command is to be issued.

If in decision block 522 SCSI bus controller 303 determines that host device 302 has won arbitration conducted in blocks 515, 516, and 520, then processing continues at block 524, wherein host device 302 proceeds with selection phase 406. Processing then ends at end block 505 while SCSI bus controller 303 continues with information transfer phases 408.

Thus, ABS process 500 of the present invention ensures that all incoming requests for service to host computer device 302 are honored. When host computer device 302 recognizes a slack on the SCSI bus (no peripheral device requesting service within the SCSI arbitration delay time), the host device 302 will issue a new command to increase the efficiency of the bus.

The present invention also compensates for SCSI peripheral devices "fighting" with each other for access to the bus. Devices that are designed using the industry standard SCSI bus controller chips will arbitrate following the dictates of the SCSI specification. Thus, devices having higher addresses will preempt the devices having lower addresses.

The host computer device having the SCSI bus controller 303 will allow all SCSI peripheral devices to achieve access to the bus before any new I/O command is issued. This ensures that the bus is running to capacity until the devices no longer have pending I/O tasks and the bus experiences a little slack. On detecting the slack, the host SCSI device immediately issues more I/O tasks to increase the bus load.

Since the SCSI bus system allows a plurality of peripheral devices connected to a host computer system, the host computer system ensures fairness between these devices by issuing new commands in order by servicing a queue associated with each device, in a sequential order. This is discussed further below with reference to FIGS. 6 and 7.

Figure 6:
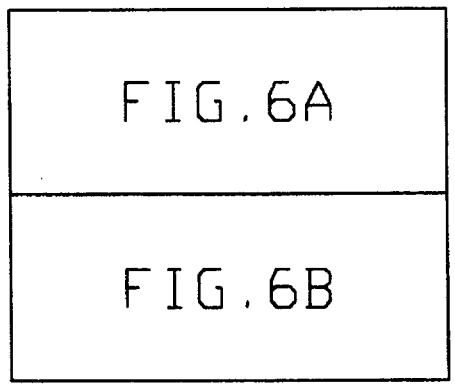
FIG. 6 is a block diagram illustrating the orientation of the flow charts illustrated in FIGS. 6A and 6B.
Figure 7:
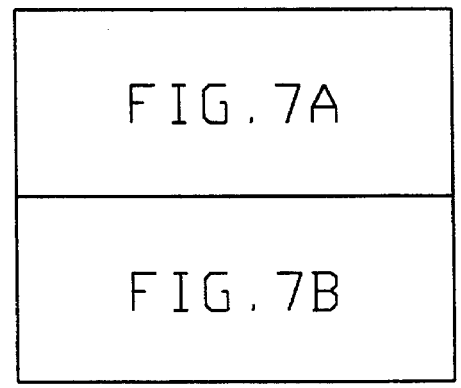
FIG. 7 is a block diagram illustrating the orientation of the flow charts illustrated in FIGS. 7A and 7B.
Figure 6A:
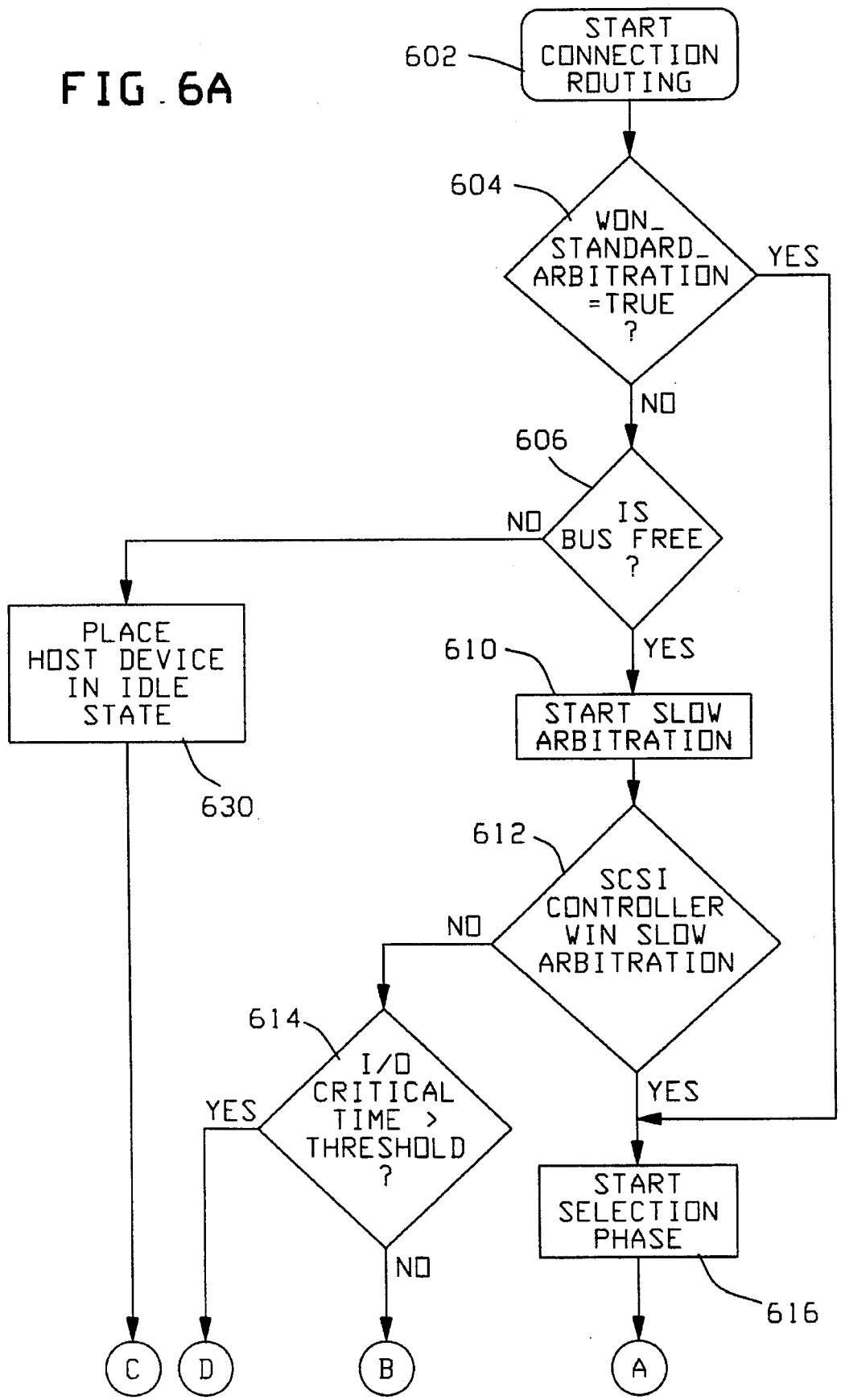
FIGS. 6A and 6B are flow charts of the connection routine of the uniform I/O and ABS process of the present invention.
Figure 6B:
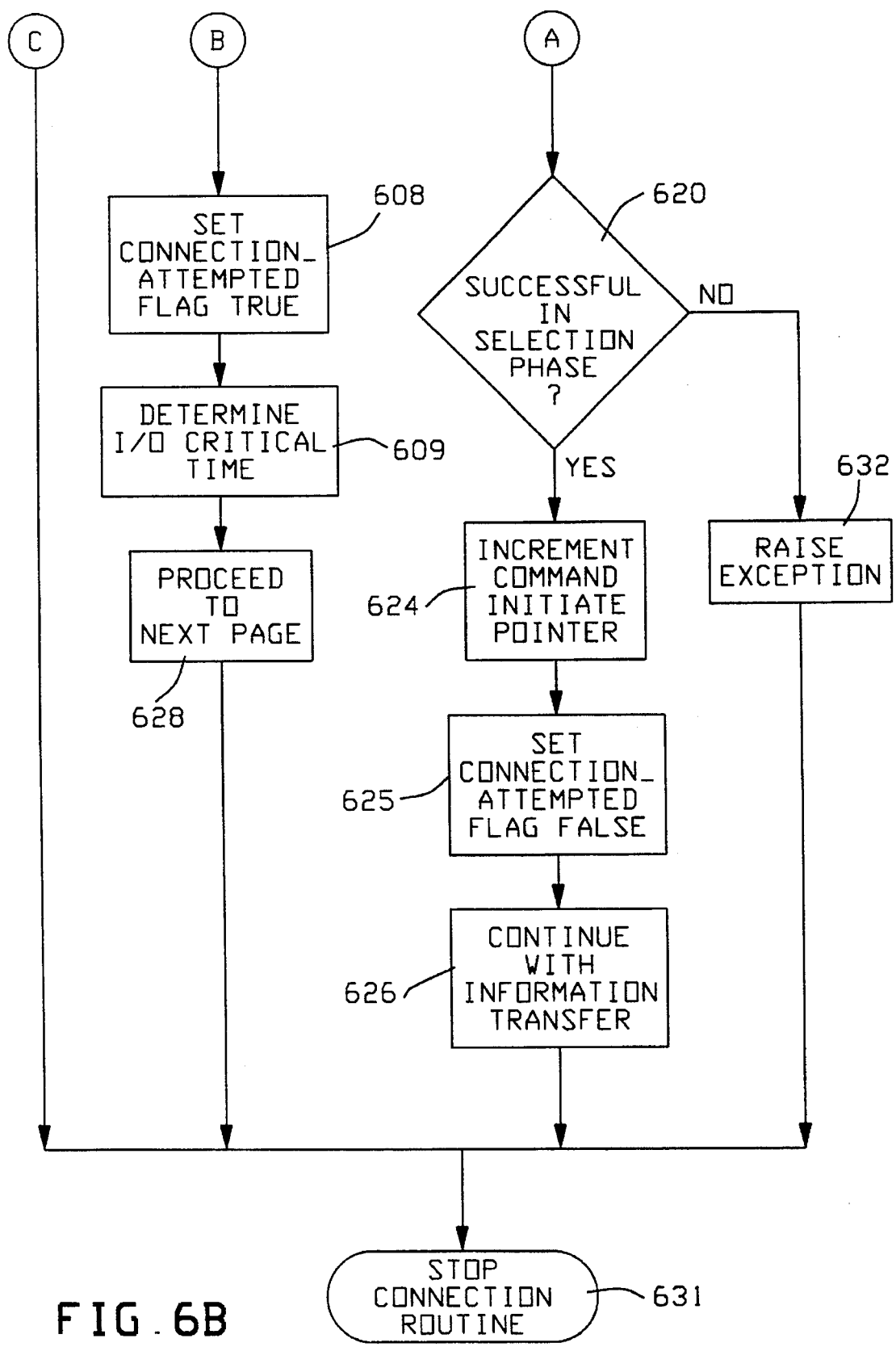
Figure 7A:
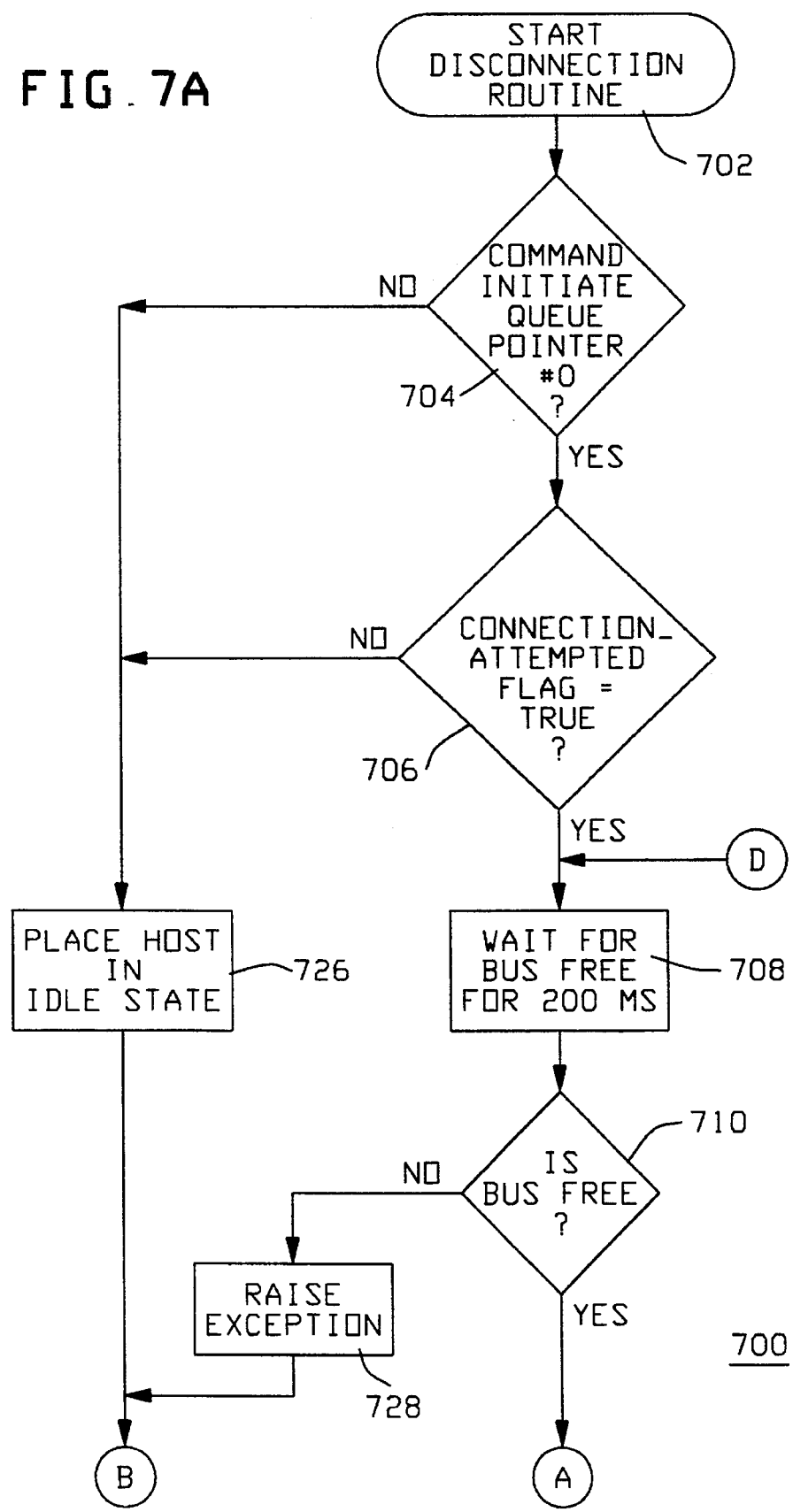
FIGS. 7A and 7B are flow charts of the disconnection routine of the uniform I/O and ABS process of the present invention.
Figure 7B:
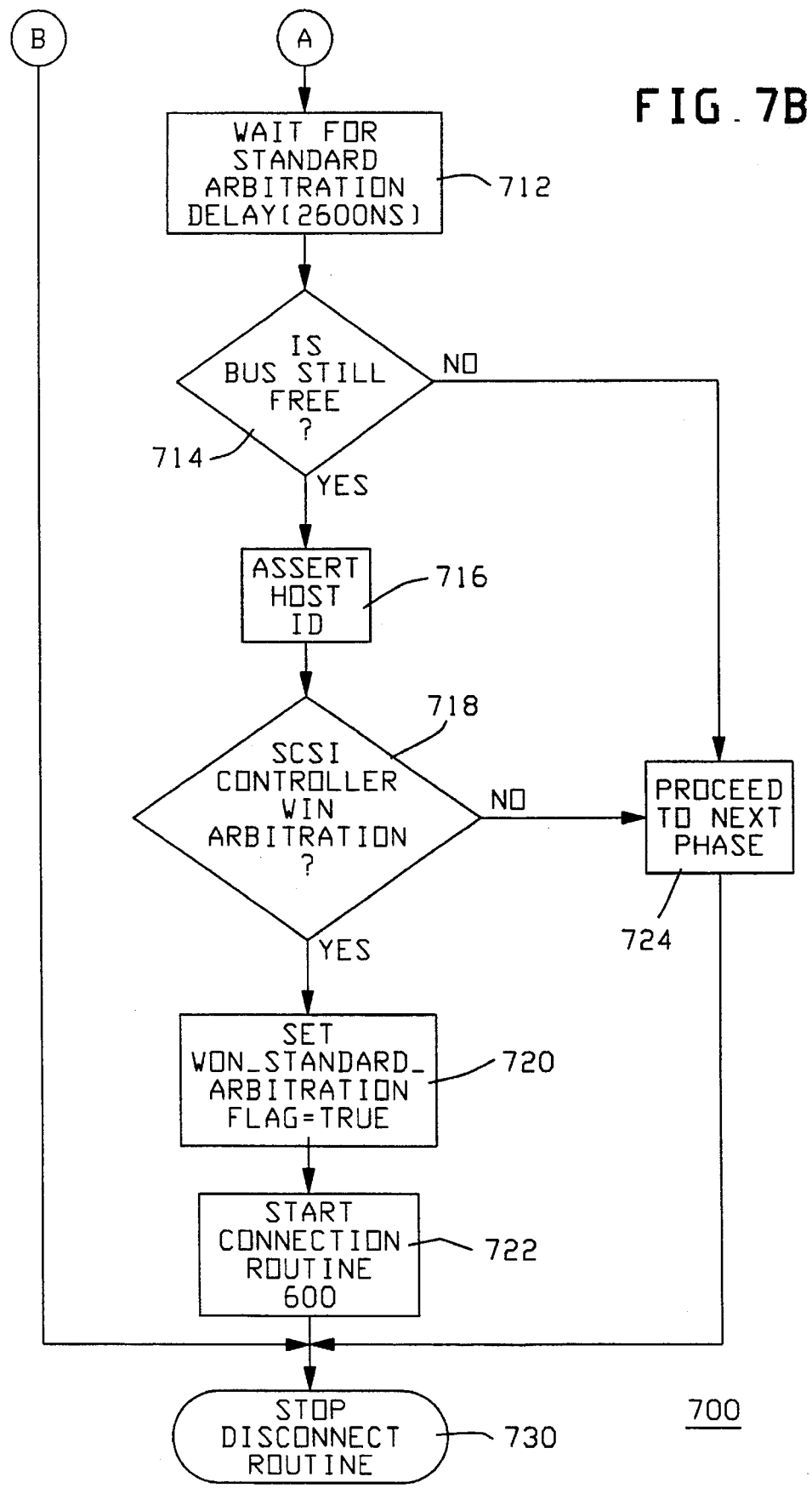

The ABS process 500 of the present invention is now described in further detail with reference to FIGS. 6, 6A, 6B, 7, 7A, and 7B. FIG. 6, 6A, and 6B provide flow charts illustrating a connection routine 600 of the present invention. FIG. 6 illustrates the orientation of the flow charts shown in FIGS. 6A and 613. FIGS. 7, 7A, and 7B provide flow charts illustrating a disconnection routine 700 of the present invention. FIG. 7 illustrates the orientation of the flow charts shown in FIGS. 7A and 7B. The connection routine 600 and disconnection routine 700 are now discussed.

Connection Routine 600

As noted above, FIGS. 6A and 6B are flow charts of a connection routine 600 which performs a number of functions discussed above with reference to FIG. 5. Connection routine 600 is a set of program instructions that is used during slow arbitration as well as standard arbitration phase 404. As will be described in detail below, connection routine 600 is invoked at block 501 during slow arbitration phase when host device 302 initially attempts to transmit an I/O command. SCSI bus controller 303 also invokes connection routine 600 at decision block 522, wherein it is determined that SCSI bus controller 303 has won standard arbitration and shall proceed with target device selection.

At start ABS process 501 SCSI bus controller 303 invokes connection routine 600. Upon being invoked at start block 602, connection routine 600 first performs functions at decision blocks 604 and 606 directed towards determining whether host device 302 should be placed in idle state and perform no I/O processing, whether slow arbitration is to be performed, or whether a selection resulting from a standard arbitration is necessary.

First, processing begins at decision block 604. In decision block 604, SCSI bus controller 303 determines if connection routine 600 is being called from a slow arbitration phase or a standard arbitration phase. This determination is made by SCSI bus controller 303 examining a won_standard_arbitration flag (discussed below with reference to FIG. 7). The won_standard_arbitration flag indicates whether SCSI bus controller 303 has previously won a standard arbitration and now requires connection routine 600 to proceed with a selection of a target peripheral device and transfer the pending I/O command.

If in decision block 604 SCSI bus controller 303 determines that the won_standard_arbitration flag is true, then SCSI bus controller 303 has previously won standard arbitration 404. Processing then continues at block 616 wherein SCSI bus controller 303 proceeds with selection phase 406. This was discussed above with reference to decision block 522 wherein SCSI bus controller 303 determined whether host device 302 has won arbitration conducted in blocks 515,516, and 520. If so, then processing continued at block 524, wherein host device 302 proceeded with selection phase 406.

If in decision block 604, SCSI bus controller 303 determines that the won_standard_arbitration flag is false, then SCSI bus controller 303 has not previously won a standard arbitration 404 and host device 302 cannot transmit the I/O command over SCSI bus 306 until a slow arbitration is performed. Processing then proceeds to decision block 606 wherein SCSI bus controller 303 determines if SCSI bus 306 is in bus free phase 402.

If SCSI bus 306 is not free, then processing proceeds to block 630 wherein SCSI bus controller 303 places host device 302 into idle state until the present activity on SCSI bus 306 is completed. Processing continues from block 630 through connector C/FIG. 6B to ending block 631 wherein connection routine 600 is completed.

If in decision block 606 SCSI bus controller 303 determines that SCSI bus 306 is in bus free phase 402, then SCSI bus controller 303 proceeds to decision block 610 to start slow arbitration phase 404. This is discussed above with reference to block 502, wherein SCSI bus controller 303 starts slow arbitration phase 404 upon entering ABS process 500.

As discussed above, the longer arbitration delay of the present invention in slow arbitration phase 404 ensures that a SCSI peripheral device requiring service from host computer 302 will be granted access to the bus 306 and have the opportunity to reselect host device 302. As discussed above with respect to blocks 502 and 504, during slow arbitration phase 404, SCSI bus controller 303 does not assert the host device ID during the standard arbitration delay of 2400 ns but instead asserts the host ID after a total of 20000 ns and only after it determines that there are no reselecting target devices.

As a result, in decision block 612 SCSI bus controller 303 determines whether it won slow arbitration; that is, whether there are any reselecting target devices. As discussed above with reference to FIG. 5A, if SCSI bus controller 303 wins slow arbitration 404, processing then proceeded from decision block 504 to block 506 wherein SCSI bus 306 enters selection phase 406, allowing host computer 302 to select a target device to initiate some target function. This is shown in FIG. 6 as processing proceeding from decision block 612 to block 616.

If in decision block 612, SCSI bus controller 303 determines that it lost slow arbitration to a reselecting target device, then processing continues at decision block 614 wherein SCSI bus controller 303 determines if the pending I/O is critical; that is, whether delaying the transmission of the I/O further will cause a system error. If the pending I/O is critical, then processing continues at block 708 of FIG. 7A through connector D/FIG. 7A. This will be discussed in detail below.

If in block 614 SCSI bus controller 303 determines that the I/O is not critical, then processing continues at blocks 608 and 609 in FIG. 5B through connector B/FIG. 6B. In blocks 608 and 609 SCSI bus controller 303 performs a number of functions in preparation for standard arbitration phase 404. This was discussed above with reference to block 508. In block 508, SCSI bus controller 303 prepared for a future standard arbitration phase 404 by performing functions such as indicating that a connection attempt had been made and determining the duration of time that the I/O command has been pending for the above criticality evaluation.

In block 608, SCSI bus controller 303 remembers that a connection was attempted by setting a connection_attempted flag. This flag is reset in block 625 after host device 302 successfully wins arbitration and selects a peripheral device. That is, the flag indicates that the pending I/O has been successfully issued.

A second function preformed by SCSI bus controller 303 is shown in block 609, wherein SCSI bus controller 303 time stamps the pending I/O command for later determination of whether it has become critical. When host device 302 first attempts to send an I/O command and loses arbitration, the time at which that occurs is stored in a variable referred to as time_of_1st_attempt. In block 609 SCSI bus controller 303 determines the value of an I/O critical time variable. This variable is calculated by subtracting the time at which the I/O was first denied (time_of_1st_attempt) from the time at which the I/O is presently being prevented (current_time).

After the preparation for standard arbitration phase 404 in blocks 608 and 609, processing continues at block 628, wherein SCSI bus controller 303 proceeds with SCSI reselection phase 406 under the control of the reselecting target device that won slow arbitration. This was described above with reference to block 510.

Following reselection phase 406, the reselecting target device will cause host computer device 302 to exchange data or status information in information transfer phases 408. At the end of information transfer phases 408, the SCSI peripheral device and host device 302 attempt to release SCSI bus 306, causing it to enter bus free phase 402. This process is shown in greater detail in FIGS. 7A and 7B and is discussed below. At the completion of block 628, connection routine 600 is completed at end block 631 and disconnection routine 700 is invoked.

As discussed above, if in decision block 612 SCSI bus controller 303 determines that it has won slow arbitration, then processing continues at block 616 wherein standard arbitration was started. After standard arbitration 404 is started in block 616, processing continues at decision block 620 through connector A/FIG. 6B.

In decision block 620, SCSI bus controller 303 determines whether the selected target device responded during selection phase 406. If the selected target device did not respond, processing continues at block 632, wherein SCSI bus controller 303 raises an exception to indicate that an error has occurred on SCSI bus 306.

Figure 8:
FIG. 8 is a block diagram of the command initiate queues utilized by the SCSI bus controller of the present invention.

If SCSI bus controller 303 determines that the selection was successful in decision block 620, then processing continues at block 624 wherein a command initiate pointer indicating the next I/O command that is to be sent to this particular target device is incremented. Referring to FIG. 8, a command initiate queue 802 is illustrated. Command initiate queue 802 stores the I/O commands designated for each target device. A command initiate queue pointer 804 is incremented to designate the current pending I/O for a particular target device. It is incremented after the command has been successfully sent in block 624.

Once the command imitate pointer is incremented in block 624, processing continues at block 625 wherein SCSI bus controller 303 sets the connection_attempted_flag false to indicate that SCSI bus controller 303 successfully connected to the selected target device.

Processing then continues at block 626 wherein SCSI bus controller 303 continues with the information transfer phases 408 according to standard SCSI protocol. Connection routine 600 then completes at end block 631.

Disconnection Routine 700

As noted above, FIGS. 7A and 7B are a flow chart of disconnection routine 700. Similar to connection routine 600, disconnection routine 700 is a set of program instructions used during slow and standard arbitration phases 404.

Disconnection routine 700 is invoked at block 510 in ABS process 500. As discussed above with reference to block 510, SCSI bus controller 303 allows the occurrence of a reselection phase 406 under the control of a reselecting target device that won slow or standard arbitration. Following reselection phase 406, the reselecting target device will cause host computer device 302 to exchange data or status information in information transfer phases 408. At the end of the information transfer phases 408, the reselecting target device sends host device 302 a SCSI bus disconnect message indicating its intention to enter bus free phase 402. Upon receiving this message, SCSI bus controller 303 invokes disconnection routine 700.

As described above, upon receiving a SCSI disconnect indication and prior to entering bus free phase 402, SCSI bus controller 303 proceeds to decision block 5 12 to determine if standard arbitration is required. Standard arbitration 404 is required when there are pending I/O commands to be transmitted due to previously losing a slow or standard arbitration. This is shown in greater detail in FIG. 7A.

Once disconnection routine 700 is invoked, SCSI bus controller 303 proceeds to block 704 to determine whether there are any I/O commands which remain pending. SCSI bus controller 303 makes this determination by checking the value of the command initiate queue pointer 804.

If command initiate queue pointer 804 is zero, then there are no I/O commands pending. This is shown in FIG. 5B as SCSI bus controller 303 determining in decision block 512 that standard arbitration is not required. Processing then proceeds from decision block 512 to block 514 to place the host device 302 in idle state. This is shown in FIG. 7A, wherein processing continues from decision block 704 to block 726. At block 726 SCSI bus controller 303 places host device 302 into idle state and SCSI bus 306 enters bus free phase 402. After SCSI controller places host device 302 into idle state, processing then passes from block 726 to end block 730 in FIG. 7B through connector B/FIG. 7B, thereby completing disconnection routine 700.

If in decision block 704 SCSI bus controller 303 determines that command initiate queue 802 contains one or more pending I/O commands waiting to be transmitted, then processing continues at decision block 706. In decision block 706, SCSI bus controller 303 determines whether the connection_attempted flag is set true. As discussed above, the connection attempted flag is set true in block 608 when the host unsuccessfully attempted to obtain access to SCSI bus 306 and is reset in block 625 when the host is granted access and successfully selects a target device. Thus, the state of the connection attempted flag indicates whether host device 302 is waiting to gain access to SCSI bus 306.

If SCSI bus controller 303 determines that the connection_attempted flag is false, host device 302 has successfully selected a target device and has successfully issued the pending I/O command. If in decision block 706 SCSI bus controller 303 determines that the connection_attempted flag is true, then host device 302 did not access SCSI bus 306 due to host device 302 intentionally losing a previous arbitration.

Thus, in decision block 512, SCSI bus controller 303 determines whether standard arbitration is required by determining if there are any I/O commands waiting to be issued (decision block 704) and if so, whether slow arbitration has previously been attempted (decision block 706). In other words, standard arbitration is required when host device 302 has lost arbitration at least once.

As discussed above, when SCSI bus controller 303 determines that standard arbitration is required, SCSI bus controller 303 begins standard arbitration at block 515 following a bus free phase 402 in block 510. Disconnection routine 700 performs a number of functions prior to starting standard arbitration. In block 708 SCSI bus controller 303 waits for a maximum of 200 ms for SCSI bus 306 to go to bus free phase 402 after disconnect in block 708. Then, in decision block 710, host SCSI bus controller 303 determines if SCSI bus 306 is in bus free phase 402. If SCSI bus 306 is not in bus free phase 402, then an error has occurred and an exception is raised in block 728. In other words, in blocks 708 and 710, host SCSI bus controller 303 verifies that the reselecting target device has disconnected and SCSI bus 306 enters bus free phase 402. When SCSI bus controller 303 determines that SCSI bus 306 entered bus free phase 402 in decision block 710, then processing continues at block 712 through connector A/FIG. 7B.

As discussed above, once standard arbitration is started in block 515, processing continues at decision block 516 wherein host computer 302 snoops the SCSI bus for an arbitration attempt by any SCSI peripheral device. Host 302 performs this function for 2600 ns (200 ns greater than the standard-specified 2400 ns delay). During the additional 200 ns host device 302 verifies that there are no reselecting target devices and determines that it shall arbitrate. Referring to FIG. 7B, this process is shown in further detail in blocks 712 and 714. In block 712, host device 302 waits for the standard arbitration delay period of 2600 ns. After the 2600 ns has elapsed, processing continues at decision block 714 wherein SCSI bus controller 303 determines whether SCSI bus 306 is still in bus free phase 402. SCSI bus 306 will not be in bus free phase 402 if a reselecting target device is or has begun a standard arbitration phase 404. On the other hand, if SCSI bus controller 303 determines in decision block 714 that SCSI bus 306 is still in bus free phase 402, then there no additional reselecting target devices and processing continues at block 716.

If SCSI bus 306 is not still free (a target is arbitrating), then processing continues to blocks 518 and 724, wherein the target device completes reselection phase 406 and information transfer phases 408, and then disconnects. That is, host device 302 yields to a requesting target device. Under the control of the requesting target device, the phases of SCSI bus 306 proceed to reselection phase 406, followed by information transfer phases 408.

As described above with respect to block 516, if SCSI bus 306 is still in bus free phase for the entire duration of 2600 ns, then SCSI bus controller 303 concludes that there are no other target devices requesting reselection. Processing then continues at block 716 wherein SCSI bus controller 303 asserts the host device ID.

In decision block 718 SCSI bus controller 303 determines whether it has lost arbitration. As described above with reference to decision block 522, this function is necessary when SCSI bus system 300 is configured with more than one host device as in the dual initiator configuration, described above. If in decision block 718 SCSI bus controller 303 determines that it has not won arbitration, then processing continues at block 724, wherein SCSI bus controller 303 causes the SCSI bus to enter bus free phase 402. This was described above with reference to decision block 522 and block 518.

As described above, if in decision block 522 SCSI bus controller 303 determines that it has won arbitration, then processing continues at block 524, wherein host device 302 proceeds with selection phase 406. Regarding disconnection routine 700, if in decision block 718 SCSI bus controller 303 determines that it has won arbitration, then processing continues at block 720, wherein the won_standard_arbitration flag is set true to indicate that host device 302 will now proceed with the selection of a target peripheral device. Disconnection routine 700 then calls connection routine 600 to perform the processing described above. This was discussed above with reference to block 524. Disconnection routine 700 then completes at end block 730.

What is claimed is:

1. A SCSI bus controller, implemented in a host device of a SCSI bus system having a SCSI bus and multiple peripheral devices, comprising:

first means for executing one or more user defined arbitration phases, each of said user defined arbitration phases comprising a SCSI standard specified arbitration phase delay period and a user defined delay period, said first means having means for refraining from asserting a host device ID until after said user defined delay period when none of said multiple peripheral devices arbitrate during said SCSI standard specified arbitration phase delay period, thereby providing the multiple peripheral devices an opportunity to sequentially gain control over the SCSI bus to complete previously issued I/O tasks prior to the host device issuing additional I/O commands.

2. The SCSI bus controller of claim 1, further comprising:

second means, coupled to said first means, for transmitting a critical I/O command, said second means asserting said host device ID after said user defined delay period regardless of whether said multiple peripheral devices arbitrate during said SCSI standard specified arbitration phase delay period, said second means preventing the occurrence of a system error.

3. In a SCSI bus system having a host device and a plurality of peripheral devices coupled to a SCSI bus, said plurality of peripheral devices including a plurality of reselecting target devices, the host device having a plurality of pending I/O commands to transmit to one or more of said plurality of peripheral devices, said plurality of pending I/O commands stored in a command initiate queue, a method for achieving uniform SCSI bus distribution, comprising the steps of:

(1) performing an arbitration phase, said arbitration phase including a SCSI standard specified arbitration phase delay period, wherein said plurality of reselecting target devices arbitrate, and an additional delay period;

(2) determining whether a first pending I/O command of said plurality of pending I/O commands is critical;

(3) prohibiting the assertion of a host device ID to thereby enabling one of said plurality of reselecting target devices to obtain control of the SCSI bus and reselect the host device;

(4) repeating said steps (1) to (3) until said first pending I/O command of said plurality of pending I/O commands becomes critical; (5) repeating said steps (1) to (4) until said plurality of peripheral devices no longer includes reselecting target devices; and (6) after said step (4) and said step (5), asserting a host device ID after said additional arbitration delay period.

4. The method of claim 3, wherein said additional arbitration delay period of each of said arbitration phases is a user-defined time duration.

5. The method of claim 3, further comprising the steps of:

(7) after said step (3), responding to a reselection of the host device by said reselecting target device; and (8) after said step (6), performing a selection phase and one or more information transfer phases.

6. In a SCSI bus system having a host device and a plurality of peripheral devices, the host device having at least one pending I/O commands to transmit to one or more of said plurality of peripheral devices, a method for achieving uniform SCSI bus distribution, comprising the steps of:

(1) performing a first arbitration phase, said first arbitration phase including a SCSI standard specified arbitration phase delay period and a first additional delay period;

(2) asserting a host device ID after said first additional delay period when said plurality of peripheral devices do not include a reselecting target device arbitrating during said SCSI standard specified arbitration phase delay period of said first arbitration phase;

(3) determining if said at least one pending I/O commands is critical when said at least one of said plurality of peripheral devices includes a reselecting target device, said reselecting target device arbitrating during said SCSI standard specified arbitration phase delay period of said first arbitration phase;

(4) responding to a reselection of the host device by said reselecting target device when said at least one of said at least one pending I/O commands is not critical;

(5) performing a second arbitration phase when said at least one pending I/O commands includes a critical I/O command and when said at least one of said plurality of peripheral devices includes one or more additional reselecting target devices, said second arbitration phase including said SCSI standard specified arbitration phase delay period and a second additional delay period, said one or more additional said reselecting target devices arbitrating during said SCSI standard specified arbitration phase delay period of said second arbitration phase;

(6) after said step (5), asserting said host device ID after said second additional delay period of said second arbitration phase when one of said pending I/O commands is critical; and (7) after said step (5), prohibiting the assertion of said host device ID when said at least one of said plurality of peripheral devices includes one or more additional reselecting target devices.

7. The method of claim 6, further comprising the step of:

(8) after said step (2), performing a selection phase and one or more information transfer phases.

8. The method of claim 6, further comprising the step of:

(9) entering bus free phase when the host device loses said second arbitration phase.

9. The method of claim 6, wherein said second arbitration phase is performed upon receipt of a SCSI disconnect message.

10. The method of claim 6, wherein said first user defined time duration is 20 microseconds.

11. The method of claim 6, wherein said second user defined time duration is 200 nanoseconds.

\* \* \* \* \*